US012649850B2

(12) United States Patent
Chen et al.

(10) Patent No.: US 12,649,850 B2
(45) Date of Patent: Jun. 9, 2026

(54) AQUEOUS DISPERSION OF POLYISOBUTYLENE AND POLYOLEFIN PARTICLES

(71) Applicant: Dow Global Technologies LLC, Midland, MI (US)

(72) Inventors: Hongyu Chen, Shanghai (CN); Yunlong Guo, Shanghai (CN); David L. Malotky, Midland, MI (US); Alan M. Piwowar, Buffalo, NY (US); Xiaomei Song, Shanghai (CN); Qiangqiang Yan, Zhejiang (CN)

(73) Assignee: Dow Global Technologies LLC, Midland, MI (US)

( * ) Notice: Subject to any disclaimer, the term of this patent is extended or adjusted under 35 U.S.C. 154(b) by 464 days.

(21) Appl. No.: 18/552,049

(22) PCT Filed: Apr. 15, 2021

(86) PCT No.: PCT/CN2021/087522

§ 371 (c)(1),
(2) Date: Sep. 22, 2023

(87) PCT Pub. No.: WO2022/217545

PCT Pub. Date: Oct. 20, 2022

(65) Prior Publication Data

US 2024/0301188 A1      Sep. 12, 2024

(51) Int. Cl.

| | |
|---|---|
| *C08L 23/22* | (2025.01) |
| *C08J 3/05* | (2006.01) |
| *C08J 7/04* | (2020.01) |
| *C08J 7/048* | (2020.01) |
| *C08L 23/0807* | (2025.01) |
| *C08L 23/0869* | (2025.01) |

(52) U.S. Cl.
CPC ................. *C08L 23/22* (2013.01); *C08J 3/05* (2013.01); *C08J 7/0427* (2020.01); *C08J 7/048* (2020.01); *C08L 23/0815* (2013.01);

*C08L 23/0869* (2013.01); *C08J 2423/08* (2013.01); *C08J 2423/22* (2013.01); *C08L 2201/14* (2013.01); *C08L 2201/54* (2013.01); *C08L 2205/02* (2013.01); *C08L 2207/062* (2013.01)

(58) Field of Classification Search
CPC .. C08L 23/22; C08L 23/0815; C08L 23/0869; C08L 2201/14; C08L 2201/54; C08L 2205/02; C08L 2207/062; C08L 23/04; C08J 3/05; C08J 7/0427; C08J 7/048; C08J 2423/08; C08J 2423/22; C08J 2301/02; C08J 2423/04; C09D 123/04; C09D 123/22
See application file for complete search history.

(56) References Cited

U.S. PATENT DOCUMENTS

| | | | |
|---|---|---|---|
| 7,803,865 | B2 | 9/2010 | Moncla et al. |
| 8,318,257 | B2 | 11/2012 | Neubauer et al. |
| 10,612,913 | B2 | 4/2020 | Arieli et al. |
| 2015/0203637 | A1 | 7/2015 | Taets |
| 2018/0248149 | A1 | 8/2018 | Johnson et al. |
| 2019/0270289 | A1 | 9/2019 | Okamoto et al. |

FOREIGN PATENT DOCUMENTS

| | | |
|---|---|---|
| JP | 2003064192 | 3/2003 |
| JP | 04463791 | 5/2010 |
| WO | 2011141496 | 11/2011 |
| WO | 2019168809 | 9/2019 |
| WO | 2022217545 | 10/2022 |

*Primary Examiner* — Alicia Bland

(57) ABSTRACT

The present invention relates to a composition comprising an aqueous dispersion of a) polyisobutylene particles; and b) polyolefin particles, which are polyethylene or polypropylene particles, wherein the weight-to-weight ratio of the polyisobutylene particles to the polyolefin particles is in the range of from 20:80 to 80:20. The composition of the present invention is useful for making coatings on paper or paperboard substrates with excellent moisture barrier and tack properties.

7 Claims, No Drawings

AQUEOUS DISPERSION OF POLYISOBUTYLENE AND POLYOLEFIN PARTICLES

BACKGROUND OF THE INVENTION

The present invention relates to an aqueous dispersion of polyisobutylene and a different polyolefin. This dispersion is useful for improving moisture vapor barrier properties for paper and paperboard substrates.

Moisture barrier properties are traditionally imparted to paper or paperboard by applying a coating, commonly molten polyethylene, onto the paper substrate, followed by cooling and calendaring. Polyethylene has the advantages of being heat sealable, flexible, and omniphobic; nevertheless, while standard in the industry, polyethylene coated paper and paperboard suffer from several disadvantages. First, thick coatings, typically around 1 mil (25 micron) need to be applied to the substrate to achieve the desired moisture barrier properties, to provide adhesion to the substrate, and to avoid film defects such as pinhole leaks. Alternatives to polyethylene such as acrylics do not provide acceptable moisture barrier properties. Furthermore, acrylics, unlike polyethylene are not easily heat sealable. Polyvinylidene chloride (PVDC) is another alternative, which provides excellent moisture barrier at low coat weights, but degrades at low temperature leading to contamination of recyclate and causing corrosion and damage to material recycling equipment.

Accordingly, it would be an advantage in the art of paper and paperboard coatings to achieve acceptable water barrier properties at a fraction of the standard film thickness required today, not only to save raw material costs, but to render the coated product suitable for recycling. Moreover, a decrease in weight of the finished article (paper cups, for example), even by as little as 2 weight percent, would have a noticeable impact on transportation costs.

SUMMARY OF THE INVENTION

The present invention addresses a need in the art by providing, in one aspect, a composition comprising an aqueous dispersion of a) polyisobutylene particles; and b) polyolefin particles, which are polyethylene or polypropylene particles; wherein the weight-to-weight ratio of the polyisobutylene particles to the polyolefin particles is in the range of from 20:80 to 80:20; wherein the composition has a solids content arising from the polyisobutylene and the polyolefin particles in the range of from 20 to 60 weight percent; wherein the polyisobutylene and polyolefin particles have a $D_{90}$ particle size in the range of from 0.1 μm to 12 μm.

In a second aspect the present invention is an article comprising a film affixed to a paper or paperboard substrate, wherein the film comprises from 20 to 80 weight percent of a polyisobutylene polymer and from 20 to 80 weight percent of a polyolefin; wherein the film has a thickness in the range of from about 3 μm to 20 μm.

DETAILED DESCRIPTION OF THE INVENTION

In a first aspect, the present invention is a composition comprising an aqueous dispersion of a) polyisobutylene particles; and b) polyolefin particles, which are polyethylene or polypropylene particles, wherein the weight-to-weight ratio of the polyisobutylene particles to the polyolefin particles is in the range of from 20:80 to 80:20; wherein the combination of polyisobutylene and the polyolefin dispersions have a solids content in the range of from 20 to 60 weight percent, based on the weight of water, the polyisobutylene, and the polyolefin; wherein the polyisobutylene and polyolefin particles having a $D_{90}$ particle size in the range of from 0.1 μm to 12 μm.

The aqueous dispersion of polyisobutylene and polyolefin polymer particles is advantageously prepared by blending an aqueous dispersion of polyisobutylene polymer particles and an aqueous dispersion of polyolefin polymer particles. The aqueous dispersion of the polyisobutylene polymer particles may be prepared by dispersing a resinous flowable polyisobutylene into water in the presence of a suitable surfactant under high shear conditions. As used herein, "polyisobutylene" refers to isobutylene homopolymers, as well as copolymers comprising repeat units of isobutylene and a comonomer, with isobutylene repeat units forming a majority of the copolymer. Examples of copolymers include poly(isobutylene-isoprene) and poly(isobutylene-succinic anhydride), and examples of commercially available polyisobutylene (also referred to as polyisobutenes) homopolymers and copolymers include Oppanol B10, Oppanol B12, Oppanol B15, Oppanol B100, and Oppanol B200 Polyisobutylenes; Glissopal V190, Glissopal V500, Glissopal V640, and Glissopal V1500 Polyisobutenes; Vistanex LM-MH, Vistanex LM-MS, LM-H Polyisobutene; Laxess X Butyl RB 100, Laxess X Butyl RB 101-3, and Laxess X Butyl RB 402 Isobutylene-isoprene Copolymers; and HRD-350, HRD-400, HRD-450, HRD-500, HRD-600, HRD-650, and HRD 950 Polyisobutylenes.

Examples of suitable surfactants include anionic surfactants such as alkali metal $C_8$-$C_{20}$-alkylbenzene sulfonates and sulfates, as well as nonionic surfactants such as secondary alcohol ethoxylates and $C_8$-$C_{20}$-alkyl glucosides. Specific examples of suitable anionic surfactants include sodium dodecylbenzene sulfonate and sodium dodecylbenzene sulfate. Secondary alcohol ethoxylates can be characterized by the following formula:

$$C_{10-15}H_{22-32}O(CH_2CH_2O)_xH$$

where x is from 8 to 50 and the $O(CH_2CH_2O)_xH$ group is bonded to a CH group on the $C_{10-15}H_{22-32}$ chain. Preferably the secondary alcohol ethoxylate is characterized by the formula:

$$C_{12-14}H_{26-30}O(CH_2CH_2O)_xH$$

where x is preferably 10 to 50, preferably 10 to 40. Commercially available examples of suitable surfactants include TERGITOL™ 15-S-40, TERGITOL 15-S-20, and TERGITOL TMN-10 Secondary Alcohol Ethoxylate Surfactants (A Trademark of The Dow Chemical Company or its Affiliates). Suitable alkyl glucosides include decyl glucoside, dodecyl glucoside, and lauryl glucoside.

The $D_{90}$ particle size of the dispersed polyisobutylene polymer particles, as determined using a dynamic light scattering particle sizing analyzer (for example, a Beckman LS230 Particle Size Analyzer), is in the range of from 0.1 μm, preferably from 0.2 μm, more preferably 0.5 μm, to 12 μm, preferably to 8 μm, more preferably to 4 μm, and most preferably to 2 μm.

The aqueous dispersion of polyolefin particles may be prepared by a continuous twin screw extrusion process as described in U.S. Pat. Nos. 8,318,257 and 7,803,865. The dispersion of polyolefin polymer particles may be prepared by dispersing the polymer particles in the presence of a dispersant, a neutralizing agent, and a coupling agent as described, for example, in U.S. Pat. No. 10,612,913. The dispersant is preferably a copolymer comprising structural units of ethylene and a carboxylic acid monomer (that is, an ethylene-carboxylic acid copolymer), wherein the copolymer has a melt flow index in the range of from 50 g/10 min to 2000 g/10 min, and the weight-to-weight ratio of structural units of ethylene to carboxylic acid monomer is in the range of from 95:5 to 70:30. The melt flow index ranges are ranges as determined by ASTM 1238, at a temperature of 190° C. and at a loaded weight bearing of 2.16 Kg.

As used herein, suitable polyolefin particles have a wide molecular weight range, but do not include polyolefin waxes, which can be described by the following formula $$H\text{-}(CH_2CHR)_x\text{-}H$$

where R is H or $CH_3$ and x is in the range of from 72 to 360.

The neutralizing agent may be an inorganic or an organic base. Examples of suitable inorganic bases include ammonia, potassium hydroxide, sodium hydroxide, and calcium hydroxide; examples of suitable organic bases include N,N-dimethylethanolamine, diethylamine, and morpholine. The concentration of neutralizing agent is preferably sufficiently high to neutralize at least half of the carboxylic acid groups in the dispersant. For example, if the dispersant comprises 0.05 mol of carboxylic acid groups, at least 0.025 mol of an neutralizer such as N,N-dimethylethanolamine would be required. Thus, the ratio of base functionality in the neutralizing agent, preferably amine groups or ammonia, to carboxylic acid groups in the dispersant is preferably at least 0.5:1. The composition prepared with a dispersant and neutralizing agent would comprise neutralizing agent, or a salt thereof, or a combination thereof.

A coupling agent may be included to improve the compatibility between the dispersant and the polyolefin. An example of a suitable coupling agent includes ethylene-co-maleic anhydride, which, when used, is present at a concentration in the range of from 5 weight percent to 20, more preferably to 10 weight percent based on the weight the polyolefin, the dispersant, and the coupling agent.

The $D_{90}$ particle size of the dispersed polyolefin particles, also as determined using a dynamic light scattering particle sizing analyzer is in the range of from 0.1 μm, preferably from 0.2 μm, more preferably 0.5 μm, to 12 μm, preferably to 8 μm, more preferably to 4 μm, and most preferably to 2 μm.

The polyolefin dispersion is a polypropylene dispersion or a polyethylene dispersion. As used herein, "a polyethylene" refers to a linear low density polyethylene; a low density polyethylene; a high density polyethylene; an ethylene-alkene copolymer such as an ethylene-co-octene copolymer, an ethylene-co-hexene copolymer, or an ethylene-propylene copolymer; an ethylene-carboxylic acid ester copolymer such as an ethylene-methyl acrylate copolymer or an ethylene-ethyl acrylate copolymer; and an ethylene-carboxylic acid copolymer such as ethylene-methacrylic acid; as well as combinations thereof. (The polyethylene-carboxylic acid copolymer is considered to be a polyethylene when it has an acid value of less than 90 mg KOH/g.)

Commercial examples of waterborne polyethylene dispersions include CANVERA™ 1110 Polyolefin Dispersion, HYPOD™ 2000 Polyolefin Dispersion, and RHOBARR™ 320 Polyolefin Elastomer Dispersion. (CANVERA, HYPOD, and RHOBARR are Trademarks of The Dow Chemical Company or its Affiliates.) As used herein, polypropylene refers to a polypropylene homopolymer as well as copolymers comprising repeat units of polypropylene and a comonomer, with polypropylene repeat units forming a majority of the copolymer.

The weight-to-weight ratio of the polyisobutylene polymer particles to the polyolefin polymer particles, preferably the polyethylene polymer particles, is preferably in the range of from 25:75 to 70:30, more preferably to 65:35.

After the dispersions are combined, the composition can be applied to paper or paperboard using a wire wound drawdown bar. The wet film is advantageously heated to remove water and to form a dried coating, preferably to a temperature in the range of from 50° C., more preferably from 70° C. to preferably 150° C., more preferably 120° C. to provide a final dried film having a thickness in the range of from 3 μm, preferably from 6 μm, and more preferably from 8 μm, to 20 μm, preferably to 16 μm, and more preferably to 12 μm.

In another aspect, the present invention is an article comprising a film affixed to a paper or paperboard substrate, wherein the film comprises from 20 to 80 weight percent of a polyisobutylene polymer and from 20 to 80 weight percent of a polyolefin, which is a polyethylene or a polypropylene, wherein the film has a thickness in the range of from about 4 μm to 20 μm. Preferably, the film comprises a polyisobutylene polymer and a polyethylene as defined hereinabove. The weight-to-weight ratio of the polyisobutylene polymer to the polyolefin polymer in the film, preferably the polyethylene polymer, is preferably in the range of from 25:75 to 70:30, more preferably to 65:35.

The weight density of the paper or paperboard is in the range of from 40 g/m² to 350 g/m². For paper, the preferred weight density is in the range of from 60 g/m² to 100 g/m²; for paperboard, the preferred weight density is in the range of from 200 g/m² to 300 g/m². The paper or paperboard may be uncoated, or pre-coated to create a smooth surface prior to the application of the coating formulation.

It has been discovered that a thin coating of a polyisobutylene-polyolefin film on a paper or a paperboard substrate imparts desirable moisture vapor barrier properties in combination with acceptably low levels of tack. The coated substrates are suitable for packaging applications that require a relatively low ratio of coated resin to substrate weight for recycling purposes.

EXAMPLES

Example 1—Preparation of Polyisobutylene Resin Dispersion A (PIBD-A)

HRD-400 Polyisobutylene resin (50 g, supplied by Shandong Hongrui New Material Technology Co., Inc.), TERGITOL™ TMN-10 Dispersant (2.8 g, 90% active) and water (2.2 g) were combined and mixed using a FlackTek SpeedMixer DAC 150.1 FV-K at 3500 rpm for 4 min. Then, additional water (45 g) was gradually added under stirring to form a waterborne polyisobutylene (PIB) dispersion with a 50% solids content and a $D_{90}$ particle size of 1.13 μm.

Example 2—Preparation of Polyisobutylene Resin Dispersion B (PIBD-B)

HRD-400 Polyisobutylene resin (50 g), TERGITOL™ 15-s-9 Dispersant (2.5 g) and water (2.5 g) were combined and mixed using a FlackTek SpeedMixer DAC 150.1 FV-K at 3500 rpm for 4 min. Then, additional water (45 g) was gradually added under stirring to form a waterborne PIB dispersion with a 50% solids and a $D_{90}$ particle size of 1.03 μm.

Example 3—Preparation of Polyisobutylene Resin Dispersion C (PIBD-C)

HRD-400 Polyisobutylene resin (50 g) and Plantacare 2000UP Decyl glucoside (5 g, 50% active, supplied by BASF) were combined and mixed using a FlackTek Speed-Mixer DAC 150.1 FV-K at 3500 rpm for 4 min. Then, additional water (45 g) was gradually added under stirring to form a waterborne PIB dispersion with a 50% solids content and a $D_{90}$ particle size of 1.02 μm.

Example 4—Preparation of Polyisobutylene Resin Dispersion D (PIBD-D)

HRD-400 Polyisobutylene resin (50 g) and DS-4 Sodium dodecylbenzene sulfonate (5 g, 23% active) were combined and mixed using a FlackTek SpeedMixer DAC 150.1 FV-K at 3500 rpm for 4 min. Then, additional water (45 g) was gradually added under stirring to form a waterborne PIB dispersion with a 50% solids content and a $D_{90}$ particle size of 0.87 μm.

CANVERA 1110 Polyolefin Dispersion (CANV, 43% solids) or RHOBARR 320 Polyolefin Dispersion (RHOB, 43% solids) were combined with the PIB dispersions at ambient temperature to form compositions as described in Table 1. All amounts listed are in grams of total dispersion unadjusted for solids content.

TABLE 1

Coating Compositions

| Ex. No. | PIBD-A | PIBD-B | PIBD-C | PIBD-D | CANV | RHOB |
|---|---|---|---|---|---|---|
| Comp. 1 | | | | | 10 | |
| Comp. 2 | | | | | | 10 |
| Comp. 3 | 8.6 | | | | | |
| Ex. 1 | 8.6 | | | | 10 | |
| Ex. 2 | | 8.6 | | | 10 | |
| Ex. 3 | | | 8.6 | | 10 | |
| Ex. 4 | | | | 8.6 | 10 | |
| Ex. 5 | 8.6 | | | | | 10 |
| Ex. 6 | | 8.6 | | | | 10 |
| Ex. 7 | | | 8.6 | | | 10 |
| Ex. 8 | | | | 8.6 | | 10 |
| Ex. 9 | 2.2 | | | | 10 | |
| Ex. 10 | 3.7 | | | | 10 | |
| Ex. 11 | 5.7 | | | | 10 | |
| Ex. 12 | 12.9 | | | | 10 | |
| Ex. 13 | 20.1 | | | | 10 | |
| Ex. 14 | 34.4 | | | | 10 | |
| Ex. 15 | 77.4 | | | | 10 | |

Coating formulations were prepared by blending components at room temperature. The blend was coated with a wire bar onto a paper sheet (60 g/m²) using a Meyer bar automatic film-coating apparatus. The coated films were dried at 100° C. for 2 min, and the dry film 5 thickness was controlled to 10±2 μm.

Table 2 shows the moisture vapor transmission rate (WVTR) performance at 38° C. and 90% relative humidity. WVTR was measured using a MOCON TRAN Model 3/33 Permeation Analyzer following ASTM D3985-02 at 38° C. and 90% relative humidity. Comparative Example 3 is the pure PIB dispersion. Film tackiness was evaluated using a PT-1000 probe tack tester with 0.5 cm/s probe speed and 1 s dwell time. WVTR is measured in g/m²-day. WVTR Reduction refers to the percent reduction in WVTR of coatings from the PB/PE blends with respect to coatings from the corresponding unblended PE dispersions in Comparative Examples 1, 2, and 4.

TABLE 2

WVTR Performance

| Ex. No. | WVTR | WVTR Reduction |
|---|---|---|
| Comp. 1 | 104.2 | N/A |
| Comp. 2 | 148.6 | N/A |
| Comp. 3 | 25.8 | N/A |
| Comp. 4 | 223.7 | N/A |
| Ex. 1 | 40.8 | 60.8% |
| Ex .2 | 77.6 | 25.6% |
| Ex. 3 | 44.0 | 57.8% |
| Ex. 4 | 79.9 | 23.3% |
| Ex. 5 | 60.0 | 59.6% |
| Ex. 6 | 82.7 | 44.3% |
| Ex. 7 | 80.9 | 45.5% |
| Ex. 8 | 78.1 | 47.4% |

The data show that coatings formed solely from polyethylene dispersions show poor WVTR (>100 g/m²-day). In contrast, WVTRs of less than 100 g/m²-day were achieved using coatings prepared either solely from PIB dispersions or blends of PIB and PE dispersions. However, as Table 3 demonstrates, the proper balance of WVTR and probe tack require coatings formed from the blends. Probe tack is measured in grams. Low tack is necessary for paper coating applications.

TABLE 3

WVTR and Probe Tack of Coatings from CANVERA and PIBD-A

| Ex. No | PIB | WVTR | Probe tack |
|---|---|---|---|
| Comp. 1 | 0 | 104.2 | 0 |
| Ex. 9 | 20 | 97.1 | 0 |
| Ex. 10 | 30 | 57.8 | 0 |
| Ex. 11 | 40 | 47.6 | 0 |
| Ex. 3 | 50 | 44.0 | 0 |
| Ex. 12 | 60 | 49.7 | 0 |
| Ex. 13 | 70 | 52.6 | 1.5 |
| Ex. 14 | 80 | 49.7 | 4.3 |
| Comp. 3 | 100 | 25.8 | 7.2 |

Coatings arising from blends of PIBD-A and CANVERA 1110 Polyolefin Dispersion, which is a dispersion of a high density polyethylene, gave excellent tack and WVTR performance across a wide range. In contrast, the coating arising from PIBD-A only gave poor tack (>4.5 g).

The invention claimed is:

1. A composition comprising an aqueous dispersion of a) polyisobutylene particles; and b) polyolefin particles, which are polyethylene or polypropylene particles, wherein the weight-to-weight ratio of the polyisobutylene particles to the polyolefin particles is in the range of from 20:80 to 80:20; wherein the composition has a solids content arising from the polyisobutylene and the polyolefin particles in the range of from 20 to 60 weight percent; wherein the polyisobutylene and polyolefin particles having a $D_{90}$ particle size in the range of from 0.1 μm to 12 μm.

2. The composition of claim 1 wherein the polyolefin particles are polyethylene particles; and the polyisobutylene particles are polyisobutylene homopolymer particles.

3. The composition of claim 2 wherein the polyisobutylene and polyethylene particles have a $D_{90}$ particle size in the range of from 0.5 μm to 4 μm.

4. The composition of claim 3 wherein the weight-to-weight ratio of polyisobutylene to polyethylene polymer particles is in the range of from 25:75 to 65:35.

5. The composition of claim 2 wherein the polyethylene particles comprise a high density polyethylene.

6. The composition of claim 2 wherein the polyethylene particles comprise an ethylene-co-octene copolymer or an ethylene-ethyl acrylate copolymer or a combination thereof.

7. The composition of claim 3 which further comprises a dispersant, a coupling agent, a neutralizing agent, or a salt of a neutralizing agent; or a combination thereof.

\* \* \* \* \*